Aug. 13, 1940.   E. E. CAHOON   2,211,197
SAFETY HANDLE FOR CONFECTIONS
Filed Sept. 15, 1938
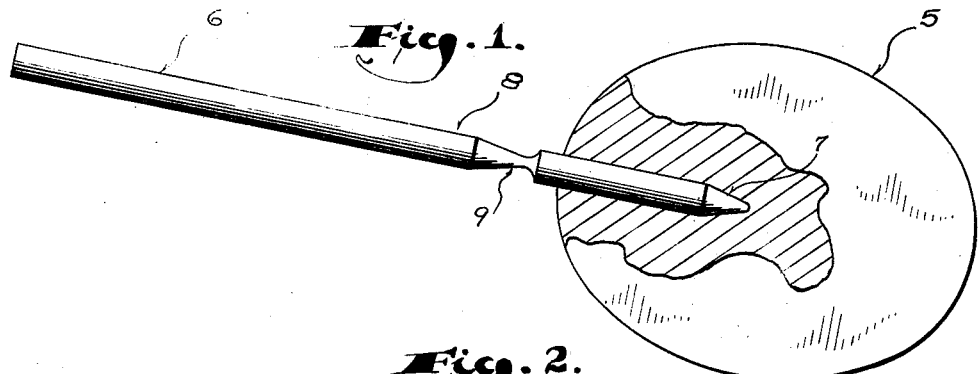
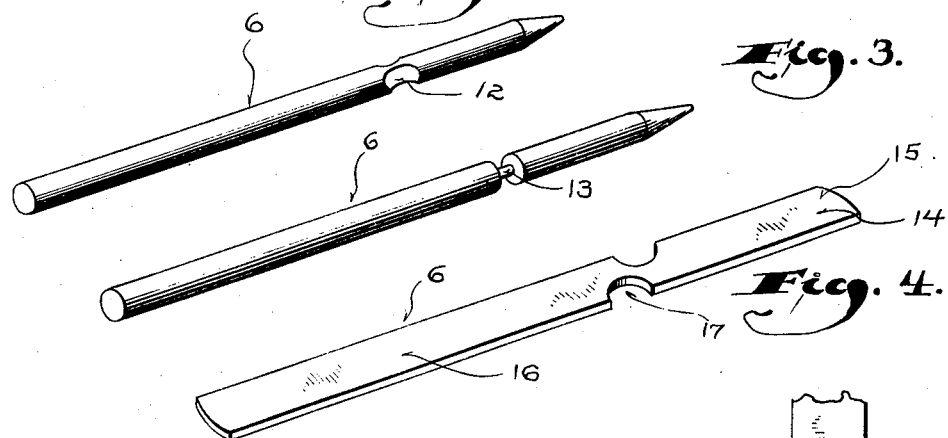
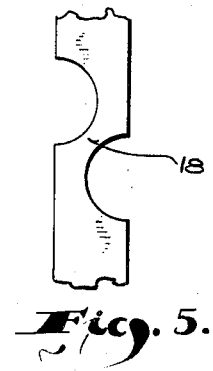
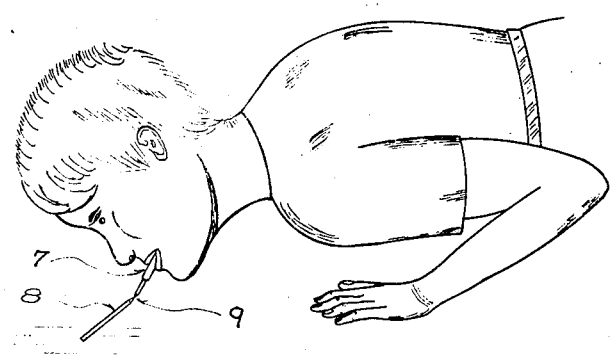
Inventor
Edward E. Cahoon Patented Aug. 13, 1940

2,211,197

UNITED STATES PATENT OFFICE 2,211,197

SAFETY HANDLE FOR CONFECTIONS

Edward E. Cahoon, Racine, Wis.

Application September 15, 1938, Serial No. 230,023

4 Claims. (Cl. 99—138)

This invention relates to lollipops and other similar confections, and refers more particularly to an improved handle therefor.

Heretofore, lollipops and other confections of this type were provided with rigid wooden sticks which were embedded in the body of the confection so that the projecting end of the stick formed a handle therefor.

While this construction provided adequate means for a user to hold the confection, the problem of injury to children, among whom this type of confection is extremely popular, was always present. Completely unaware of danger, children oftentimes disregarded the handle of the confection preferring to hold the same in their mouths while concentrating all of their attention upon games or other forms of amusement. Inasmuch as these amusements generally include running, climbing or jumping, the consequent danger of a child falling while holding a confection in his mouth with the handle protruding is evident.

Instances in which the interior of the child's mouth or throat has been seriously injured due to falling while unthinkingly romping with the confection in his mouth unattended are numerous. Obviously, the danger of injury to the mouth or throat is multiplied in the event pieces of the confection, which is usually hard, have been bitten off and leave sharp edges protruding therefrom.

With a view toward overcoming these dangers, this invention contemplates providing lollipops or other similar confections with a handle so designed as to render the use of these confections by children non-injurious.

More specifically, it is an object of this invention to provide lollipops or other like confections with a handle having a weakened or frangible portion adapted to give way and separate the handle from the confection itself upon the application of force on the handle.

A further object of this invention is to provide a handle for lollipops and like confections, which is breakable upon the application of force thereon and which does not require special machinery for insertion thereof into the confection in the manufacture of the confection.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best modes so far devised for the practical application of the principles thereof, and in which:

Figure 1 is an enlarged view of a lollipop with parts thereof broken away to show the application of the improved handle thereto;

Figure 2 is a perspective view of a modified form of handle;

Figures 3 and 4 are views similar to Figure 2 illustrating further modified forms of handle;

Figure 5 is a detail view in elevation to illustrate the manner in which an axial compression force applied to the stick shown in Figure 4 can break the same; and Figure 6 is a view illustrating the manner in which the handle is broken off and separated from the body of the confection upon the application of force on the handle as when a child, having a lollipop in its mouth, falls.

Referring now particularly to the accompanying drawing, in which like numerals indicate like parts, the numeral 5 designates a lollipop or other confection having a handle 6. The handle 6 is preferably a round stick with one end 7 embedded or molded into the body of the lollipop. The remaining portion 8 of the handle, which projects from the lollipop, as is customary, provides means by which the confection may be held.

The handle 6 is preferably formed of wood and between its portions 7 and 8 it is weakened through the provision of a neck 9 of smaller diameter than the other portions of the handle. The neck 9 has, however, sufficient strength to permit inserting the handle 6 into the body of the lollipop in the customary manner with machines now in use for that purpose.

Machines now in use, to insert sticks into the candy, require only that the stick be substantially uniform in diameter throughout its length; and inasmuch as the handle 6 with the exception of its reduced frangible portion between its sections 7 and 8, is of substantially uniform diameter, it is obvious that no special machinery is required in the manufacture of lollipops utilizing the handle of the present invention.

As shown in Figure 6, the application of force on the handle acts to sever the connection between the sections 7 and 8. It is therefore obvious that should a child fall or bump against the handle while holding the lollipop in his mouth, that the resultant breakage at the neck 9, which separates the handle from the body of the lollipop, substantially precludes the possibility of injury resulting to the child.

The modified embodiments of the invention shown in Figures 2 and 3 are substantially like that shown in Figure 1, the only difference being in the specific formation of the weakened necks. In the construction of Figure 2, the neck is formed by cutting two diametrically opposite notches 12 in the stick; and in Figure 3, the frangible portion consists of a neck 13 of uniform diameter throughout its length as distinguished from the construction of Figure 1 in which the neck tapers.

In the modified embodiment of the invention illustrated in Figure 4, the handle comprises a substantially flat stick 14 of the type used in connection with frozen confections, such as ice cream bars or the like.

As in the preferred embodiment of the invention, the end 15 of this stick is adapted to be embedded or molded into the body of the confection with the handle portion 16 protruding therefrom. Medially of its ends, but at a point adapted to lie outside of the body of the confection, the opposite edges of the stick are notched as at 17. The notches 17, as best shown in Figure 5, are not directly opposite each other, but are offset so that the narrow neck 18 formed by the stick portion left between the bottoms of the notches extends diagonally across the grain of the wooden stick.

With this disposition of the notches and the neck connecting the handle portions 15 and 16, the connection between the portions is more readily broken upon the application of a direct compression force on the end of the handle; and inasmuch as the neck 18 at its weakest point is substantially square in cross section, it will be obvious that the force necessary to sever the connection will be the same whether the handle is subjected to bending stress or compression.

From the foregoing description taken in connection with the accompanying drawing, it will be apparent to those skilled in the art that this invention affords a novel handle for lollipops or like confections through the use of which a very serious danger of injury to the user is completely eliminated, and that this improvement can be utilized without entailing the provision of special machinery for the manufacture of the confections.

What I claim as my invention is:

1. A lollipop stick comprising: a handle portion and a portion adapted to be embedded in the body of a lollipop, said stick portions being of substantially the same cross sectional dimensions; and a diagonally extending neck of smaller cross sectional area connecting said portions and extending at an angle to the longitudinal axis of the stick so as to give way readily upon the application of any undue force on the handle portion in any direction while the embedded portion is held.

2. A safety stick for confections, one end portion of which constitutes a handle when the other end portion thereof is embedded in a mass of confection, both of said end portions being of substantially the same cross sectional dimensions, said stick being notched at opposite sides thereof in such a manner as to provide a relatively weak safety neck between said portions, the notches so produced being longitudinally spaced along the longitudinal axis of the stick, and outside the mass of confection, which neck is readily broken upon the application of any lateral or compressive force on one end portion of the stick while the other portion is held substantially rigid.

3. A safety stick for confections, one end portion of which constitutes a handle when the other end portion thereof is embedded in a mass of confection, said stick having a substantially uniform flat cross section throughout its length and having a notch cut into each marginal edge thereof, said notches being longitudinally spaced but adjacent to each other so as to provide a narrow diagonal easily broken neck connecting said end portions exteriorly of the mass of confection, said neck being of such proportions as to be broken upon the application of any lateral or compressive force on either end portion of the stick while the other end portion is held substantially rigid.

4. A safety stick for confections, one end portion of which constitutes a handle when the other end portion thereof is embedded in a mass of confection, said stick having a substantially flat cross section and having a notch cut into each side edge thereof, said notches extending inwardly to points adjacent to the center of the flat portion of the stick and being adjacent to but longitudinally spaced from one another a distance such as to provide a narrow diagonally extending neck, said diagonal neck providing a safety connection between the end portions of the stick exteriorly of the mass of confection which is readily broken upon the application of any lateral or compressive force to the handle portion of the stick while the other portion of the stick is held substantially rigid to thereby prevent the application of endwise force on said other portion.

EDWARD E. CAHOON.